(12) United States Patent
Rabenko et al.

(10) Patent No.: US 7,046,796 B2
(45) Date of Patent: May 16, 2006

(54) SYSTEM AND METHOD FOR PROVIDING POWER OVER A HOME PHONE LINE NETWORK

(75) Inventors: Theodore F. Rabenko, Duluth, GA (US); Charles G. Wier, Suwanee, GA (US); Steven L. Caine, Lawrenceville, GA (US); John H. Gleiter, Cumming, GA (US); Kevin L. Miller, Lawrenceville, GA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 11/034,182

(22) Filed: Jan. 13, 2005

(65) Prior Publication Data

US 2005/0117740 A1    Jun. 2, 2005

Related U.S. Application Data

(63) Continuation of application No. 09/840,297, filed on Apr. 24, 2001, now Pat. No. 6,862,353.

(60) Provisional application No. 60/199,732, filed on Apr. 24, 2000.

(51) Int. Cl.
    *H04M 19/08* (2006.01)
(52) U.S. Cl. .................................... 379/413
(58) Field of Classification Search ............... 370/353; 379/413, 413.01
    See application file for complete search history.

(56) References Cited

U.S. PATENT DOCUMENTS

| | | | |
|---|---|---|---|
| 3,334,293 A | 8/1967 | Schultz | |
| 3,899,745 A | 8/1975 | Fletcher et al. | |
| 4,901,038 A | 2/1990 | Dusclaux et al. | |
| 5,619,080 A | 4/1997 | Pennington et al. | |

(Continued)

FOREIGN PATENT DOCUMENTS

WO    97/47082    12/1997

(Continued)

OTHER PUBLICATIONS

"Ethernet Uebers Heimische Telefonnetz" Elektronik, Franzis Verlag GMBH. Munchen, DE, vol. 48, No. 17, dated Aug. 24, 1999, pp. 20 and 22.

(Continued)

*Primary Examiner*—Sinh Tran
*Assistant Examiner*—Walter F Briney, III
(74) *Attorney, Agent, or Firm*—Sterne Kessler Goldstein & Fox PLLC (57) ABSTRACT

A system and method is provided for supplying power over a home phone line network in a manner that is interoperable with other voice and data services operating on the same network. The system includes a power source coupled to the home phone line network. The power source includes an AC signal generator that generates an AC signal at a selected frequency. The power source also includes a band pass filter for removing unwanted harmonics from the AC signal, thereby generating a filtered AC signal for powering one or more devices on the home phone line network. One or more devices attached to the home phone line network, such as a telephone adapter or telephone, receives the filtered AC signal. Each device comprises a second band pass filter and an AC/DC converter. The second band pass filter passes the filtered AC signal to the AC/DC converter and prevents the introduction of undesired harmonics onto the home phone line network from the AC/DC converter. The AC/DC converter converts the filtered AC signal to a DC signal used for powering the device.

19 Claims, 6 Drawing Sheets

U.S. PATENT DOCUMENTS

| | | |
|---|---|---|
| 5,649,006 A | 7/1997 | Koizumi |
| 6,393,105 B1 | 5/2002 | Beveridge |
| 6,477,249 B1 | 11/2002 | Williamson et al. |
| 6,480,510 B1 | 11/2002 | Binder |
| 6,580,710 B1 * | 6/2003 | Bowen et al. ............... 370/353 |
| 6,658,108 B1 * | 12/2003 | Bissell et al. ............... 379/413 |
| 6,690,677 B1 | 2/2004 | Binder |
| 6,862,353 B1 * | 3/2005 | Rabenko et al. ............ 379/413 |

FOREIGN PATENT DOCUMENTS

| | | |
|---|---|---|
| WO | 99/36802 | 7/1999 |
| WO | 01/06751 | 1/2001 |

OTHER PUBLICATIONS

Copy of International Search Report issued Oct. 9, 2002 for Appln. No. PCT/US01/13030, 6 pages.

* cited by examiner

SYSTEM AND METHOD FOR PROVIDING POWER OVER A HOME PHONE LINE NETWORK

CROSS-REFERENCE TO RELATED APPLICATIONS

This application is a continuation of U.S. patent application Ser. No. 09/840,297, filed Apr. 24, 2001, now U.S. Pat. No. 6,862,353 now allowed, which claims priority to provisional U.S. Patent Application No. 60/199,732, entitled "HPNA Powering Concept," filed Apr. 24, 2000, by Rabenko et al., each of which is incorporated by reference as if fully set forth herein.

BACKGROUND OF THE INVENTION

1. Field of the Invention

The present invention is directed to home phone line networks. More particularly, the present invention is directed to the delivery of power over home phone line networks.

2. Background

A. Home Phone Line Networks

Home networking is becoming increasingly popular. This increased popularity is due, in part, to an increase in the number of households with more than one personal computer (PC). According to the International Data Corporation (IDC), more than 20 million U.S. households have more than one computer. Additionally, market research indicates that consumers who currently own PCs are also the same consumers buying the majority of new computers. As a result, multi-computer households are becoming increasingly common. Home networks provide a variety of benefits to such multi-computer households. For example, home networks permit the users of multiple PCs to share a common printer, share files such as images, spreadsheets and documents, and access the Internet via a common network connection.

In addition to PCs, a wide variety of other devices may be attached to a home network including, but not limited to, PC peripheral devices, broadband media players, and telecommunication devices. For example, televisions and audio equipment can reside on a home network for receiving video and audio content over the Internet via a dial-up, cable, xDSL, or wireless connection. Additionally, VoIP (Voice over Internet Protocol) telephones can be connected to the home network for enabling Internet telephony via an external network connection.

Conventional home network types include home phone line, home power line, Ethernet, wireless connections, or some combination of the above. Home phone line networking is considered advantageous because it is relatively inexpensive and easy to install. Indeed, as the vast majority of U.S. homes include at least one phone line (and a majority of U.S. homes include two phone lines), home phone line networking typically does not require the installation of any additional wiring in the home.

Home phone line networking is often referred to as HomePNA or HPNA because it is based on specifications developed by the Home Phoneline Networking Alliance. The alliance is a consortium of networking technology companies that have created a phone line standard for the networking industry. HPNA uses a method known as Frequency Division Multiplexing (FDM) to permit voice and data to travel on the same phone line simultaneously without interfering with each other. HPNA 1.0, the original version of the standard, operates at 1 Mbps. The current specification, HPNA 2.0, operates at a faster 10 Mbps.

B. Internet Telephony Over Home Phone Line Networks

The use of a home phone line network for Internet telephony is particularly advantageous because it permits additional telephone numbers, and associated telephony devices, to be added to the customer premises without requiring the installation of additional telephone wire. This is in contrast to Plain Old Telephone Service (POTS), in which an additional wire pair must be installed in a home in order to support each additional phone number.

Where multiple telephony devices are connected to a home phone line network, multiple interfaces are required. The interface between a telephony device and a home phone line network may reside in an adapter or in the telephony device itself. In either case, it would be advantageous to provide power to the multiple interfaces from a single external power source. In this way, the circuitry for generating the power signal need not reside within the interface itself, thereby permitting the interface to be manufactured more cheaply. What is desired, then, is a system and method for providing power from a single power source to one or more devices, such as telephone adapters and/or telephones, over a home phone line network.

Additionally, it is anticipated that customers with Internet telephones residing on a home phone line network will expect lifeline service. Lifeline service entails the delivery of phone service even in the absence of power to the customer premises, as in the case of a power outage. POTS customers have become accustomed to lifeline service since POTS phones have traditionally been powered by a signal transmitted over the phone line from a telephone company's Central Office (CO). Accordingly, a system and method is desired for providing power to one or more telephony devices on a home phone line network from a source external to the customer premises. In light of the fact that many home phone line networks are interfaced via a residential gateway to data-over-cable systems, it would be beneficial to provide power from an external power source such as the HFC (hybrid fiber coaxial) network associated with a data-over-cable system.

Finally, home phone line networks by definition must be capable of supporting a variety of services for transporting both voice and data. Accordingly, the system and method for providing power over a home phone line network should be interoperable with other services that are delivered over the home phone line network, such as POTS and HPNA.

BRIEF SUMMARY OF THE INVENTION

The present invention is directed to a system and method for supplying power over a home phone line network in a manner that is interoperable with other voice and data services operating on the same network. In embodiments, the system comprises a power source coupled to the home phone line network. The power source comprises an AC signal generator and a band pass filter. The AC signal generator generates an AC signal for powering one or more devices on the home phone line network, and the band pass filter removes undesired harmonics from the AC signal to generate a filtered AC signal for transmission on the home phone line network.

In embodiments of the invention, one or more devices attached to the home phone line network, such as a telephone adapter or telephone, receives the filtered AC signal.

Each device comprises a second band pass filter and an AC/DC converter. The second band pass filter passes the filtered AC signal to the AC/DC converter and prevents the introduction of undesired harmonics created by the AC/DC converter onto the home phone line network. The AC/DC converter converts the filtered AC signal to a DC signal used for powering the device.

In embodiments of the invention, the power source is itself powered by an HFC/cable network, a battery, or a residential AC utility power supply. In further embodiments of the invention, the power source may comprise a resonant mode power supply, an oscillator and linear amplifier, or a class D amplifier.

The invention is advantageous in that it permits power to be supplied from a single power source to one or more devices, such as telephone adapters and/or telephones, over a home phone line network.

The invention is also advantageous in that it allows one or more devices on a home phone line network to be powered by a source external to a customer premises, such as an HFC/cable network.

The invention is further advantageous in that it permits lifeline telephony service to be provided to one or more telephony devices over a home phone line network such that the devices will operate in the absence of AC line power to the customer premises.

Another benefit of the invention is that it permits power to be supplied to one or more devices over a home phone line network in a manner that is interoperable with POTS and HPNA.

Yet another benefit of the invention is that it provides for highly efficient power conversion in supplying power from a single power source to one or more devices over a home phone line network.

Additional features and advantages of the invention will be set forth in the description that follows, and in part will be apparent from the description, or may be learned by practice of the invention. The objectives and other advantages of the invention will be realized and attained by the system and method particularly pointed out in the written description and claims hereof as well as the appended drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

A. Overview of the Invention

The present invention is generally directed to a system and method for providing power from a single power source to one or more network-attached devices, such as phone adapters and/or telephones, over a home phone line network. In embodiments, the single power source is itself powered by a signal received over an HFC/cable network. However, it should be noted that the invention is not so limited, and the single power source may be powered by other means. For example, power may be supplied to the single power source from other external sources, such as from a xDSL line, or from a local source, such as a battery (e.g., an uninterruptible power supply (UPS)), or a customer's residential AC utility power.

B. Example Operating Environment

1. Exemplary Data-Over-Cable System

Figure 1:
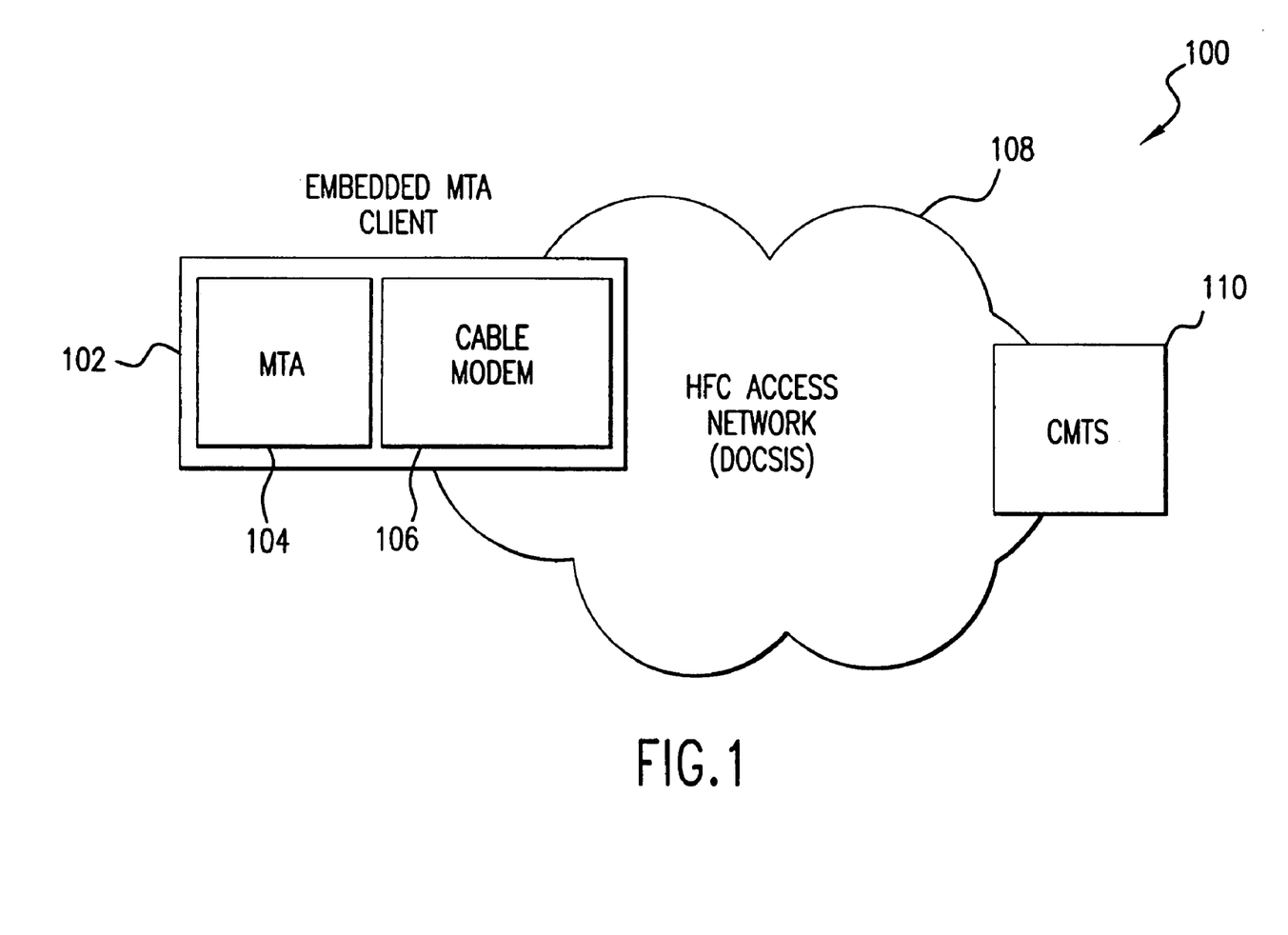
FIG. 1 depicts an exemplary data-over-cable system with which embodiments of the present invention may operate.

FIG. 1 depicts an exemplary data-over-cable system 100 with which embodiments of the present invention may operate. The exemplary data-over-cable system 100 enables voice communications, video and data services based on a bi-directional transfer of Internet protocol (IP) traffic between a cable system headend and customer locations over an all-coaxial or hybrid-fiber/coax (HFC) cable network. The exemplary data-over-cable system 100 includes the following functional components: an embedded MTA device 102, comprising a cable modem (CM) 106 and a multi-media terminal adapter (MTA) 104, an HFC/cable network 108, and a cable modem termination system (CMTS) 110.

The HFC/cable network 108 provides for the high-speed, reliable, and secure transport of data between the CMTS 110 at the cable headend and the embedded MTA device 102 at the customer premises (e.g., a home). In embodiments, the HFC/cable network 108 comprises coaxial cable, fiberoptic cable, or a combination of coaxial cable and fiberoptic cable linked via a fiber node.

The CMTS 110 is an element at the cable headend that controls the upstream and downstream transfer of data between itself and the cable modem 106 (within the embedded MTA device 102), as well as any other cable modems to which it may be attached by means of the HFC/cable network 108. The CMTS 110 modulates and terminates RF signals going to and coming from the HFC/cable network 108, and bridges these to a more generic type of data transport to connect with a network backbone (not shown).

The embedded MTA device 102 operates as an interface, or gateway, between one or more user devices at the customer premises and the HFC/cable network 108 and permits the user devices to send and receive data over the HFC/cable network 108. Such user devices may include a personal computer, a telephony device, or any other user device capable of sending and/or receiving data over a packet-switched network. In the example data-over-cable system 100, only one embedded MTA device 102 is shown for clarity. In general, any number of embedded MTA devices may be included in the exemplary data-over-cable system 100.

As shown in FIG. 1, the embedded MTA device 102 includes both a cable modem 106 and an MTA 104.

The cable modem 106 is a client device that facilitates the delivery of IP-based data services over the HFC/cable network 108 to the customer premises in compliance with the DOCSIS specification published by CableLabs.

The MTA 104 is a client device designed to link telephone handsets to the HFC/cable network 106 to permit the delivery of VoIP to subscriber homes. The MTA 104 resides at the customer site and is connected to other cable network elements via the cable modem 106 and the HFC/cable network 108. The MTA 104 contains a subscriber-side interface to the customer's telephony equipment and a network-side signaling interface to call control elements over the HFC/cable network 108. The MTA 104 provides codecs and all signaling and encapsulation functions required for media transport and call signaling.

Design specifications for the MTA 104 are defined by the PacketCable 1.0 specification as published by Packet-Cable™. See PacketCable™ Embedded MTA Primary Line Support Specification PKT-SP-EMTA-PRIMARY-I01-001128, incorporated by reference in its entirety herein. Currently, PacketCable 1.0 defines support for an embedded MTA device, such as the embedded MTA device 102, which is a single hardware device that incorporates a cable modem and an MTA. Accordingly, where an embedded MTA device is used, the cable modem provides the critical connection between the MTA and the HFC/cable network.

In the exemplary data-over-cable system 100, power for the embedded MTA device 102 is provided by the service provider from the cable headend, via the HFC/cable network 108.

2. Exemplary Home Network System

Figure 2:
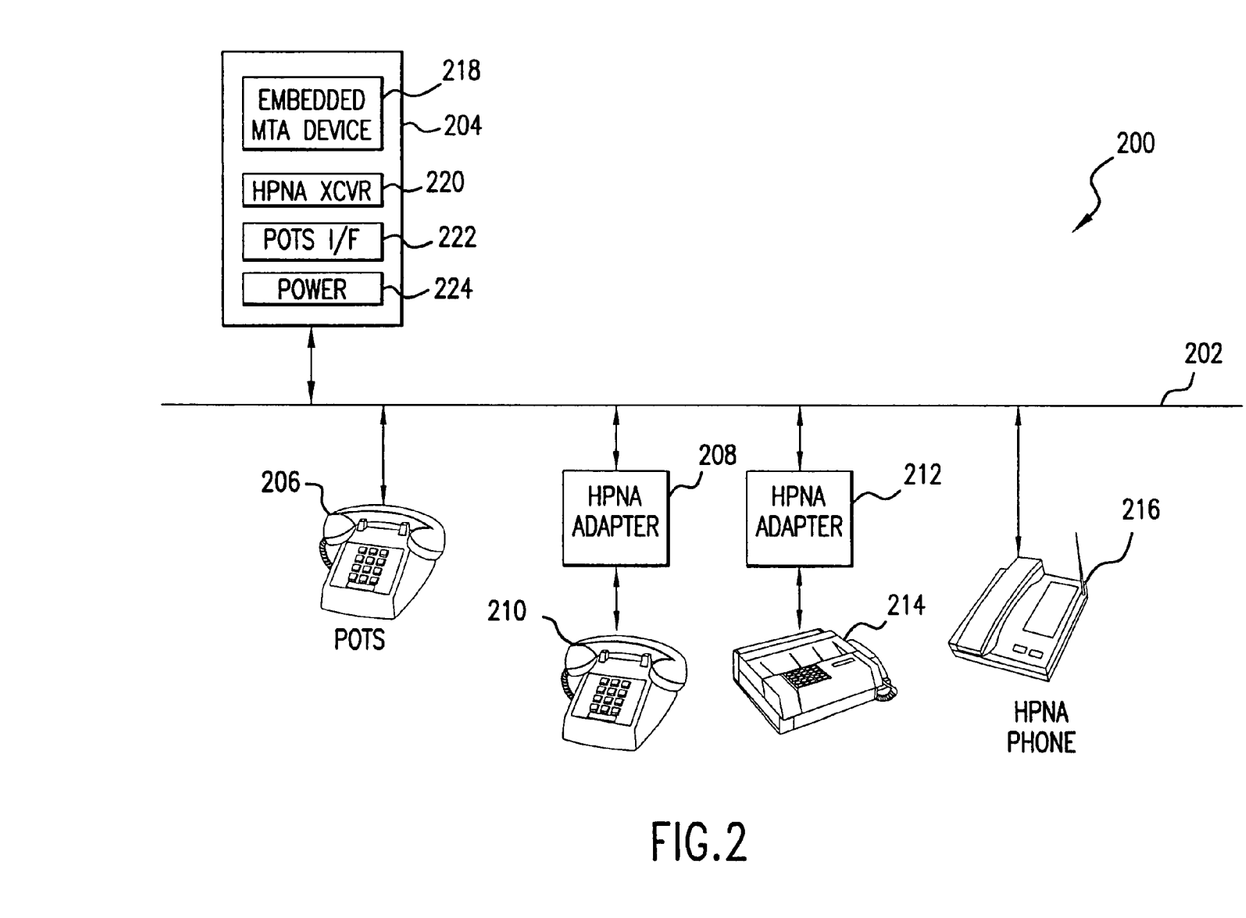
FIG. 2 illustrates an exemplary home network system in which embodiments of the present invention may operate.

FIG. 2 illustrates an exemplary home network system 200 in which embodiments of the present invention may operate. The exemplary home network system 200 includes a home phone line network 202 and several network-attached devices including a residential gateway 204, a POTS phone 206, a first HPNA adapter 208, a first telephony device 210, a second HPNA adaptor 212, a second telephony device 214, and an HPNA phone 216. It will be appreciated that other customer premises equipment may be attached to the home phone line network 202. Such equipment may include one or more PCs, PC peripherals, PC-controlled appliances, audio and video equipment, and/or other electronic devices.

In the exemplary home network system 200, the home phone line network 202 provides the physical connection between the residential gateway 204 and the other network-attached devices shown in FIG. 2. In embodiments, the home phone line network 202 comprises a twisted copper wire pair as conventionally used in providing residential phone service. In the exemplary home network system 200, the home phone line network 202 supports at least two-well known protocols for the delivery of in-home services. The first protocol delivers POTS as described in Bellcore® (now Telcordia™) Technical Reference TR-NWT-000057 "Functional Criteria for Digital Loop Carrier Systems." The second protocol is HPNA as described in the Version 2.0 specification.

The POTS phone 206 represents a traditional POTS telephone that is connected to the residential gateway 204 for telephone service. In accordance with the example home network system 200, the existing premises wiring is disconnected from the telephone company's CO that supplies normal POTS and xDSL services. Instead, POTS service at the customer premises is provided by subscriber line interface circuits (SLICs) within the residential gateway 204.

In embodiments, additional POTS phones (not shown) may be bridged on the home phone line network 202. In such a configuration, the bridged phones will behave as a bridged phone on a traditional POTS line. In other words, all bridged telephones will be assigned to the same phone number and the ring/dial tone behavior is as described in TR-NWT-000057.

Two additional telephony devices, first telephony device 210 and second telephony device 214, are connected to the home phone line network 202 via the first HPNA adapter 208 and the second HPNA adapter 212, respectively. In the example home network system 200, the first telephony device 210 and the second telephony device 214 comprise standard POTS devices that could be used to receive service on a traditional POTS connection. For example, the first telephony device 210 may be a standard POTS phone and the second telephony device 214 may be a fax machine. The HPNA adapters 208 and 212 permit these telephony devices to communicate over the home phone line network 202 to an HPNA interface within the residential gateway 204 using HPNA protocols. In this example, the HPNA adapters 208 and 212 provide two additional phone numbers that are different from the phone number assigned to the POTS phone 206 described above.

The HPNA phone 216 shown in FIG. 2 is a telephone that integrates the function of an HPNA adapter and a telephone. As such, the HPNA phone 216 will look and operate just like any traditional telephone but use an HPNA interface to accomplish the voice transport and signaling function instead of a POTS interface. In this example, the HPNA phone 216 provides another additional phone number that is different from the phone number assigned to the POTS phone 206 described above.

The residential gateway 204 operates as the interface between the home phone line network 202 and an HFC/cable network (not shown). The residential gateway 204 provides a means to convert the physical media and protocols used for an external IP network to the physical media and protocols used on the in-home wire pair. In the described exemplary embodiment, a DOCSIS (Data Over Cable Service Interface Specification) network is used for delivery of IP services over the HFC/cable network to the customer premises.

The residential gateway 204 includes an embedded MTA device 218, an HPNA transceiver 220, a POTS interface 222, and a power source 224.

The embedded MTA device 218 is analogous to the embedded MTA device 102 described in reference to FIG. 1, above. Accordingly, the embedded MTA device 218 includes an MTA that provides an interface to telephony devices on the home phone line network 202 for providing VoIP services. The embedded MTA device 218 also includes a cable modem that provides an interface to the external HFC/cable network for the delivery of an IP data stream.

The HPNA transceiver 220 within the residential gateway 202 comprises a front-end for converting analog HPNA signals on the home phone line network 202 into a digital format for processing by an HPNA interface within the embedded MTA device 218, and, conversely, for converting digital signals from an HPNA interface within the embedded MTA device 218 into analog HPNA-signals for transmission to devices on the home phone line network 202.

The POTS interface 220 provides an interface between the POTS phone 206 and the embedded MTA device 218 so that phone service may be delivered over the IP network. Accordingly, the POTS interface 222 contains the high voltage circuits and processing elements necessary to convert packetized voice delivered over IP streams into the continuous analog voltages required for conventional POTS service.

The power source 224 supplies power to one or more devices on the home phone line network 202, such as the first HPNA adapter 208, the second HPNA adapter 212, and/or the HPNA phone 216. Like the embedded MTA device 218, the power source 224 is itself powered by a raw rectified AC source voltage from the external HFC/cable network. The manner by which the power source 224 supplies power to devices on the home phone line network will be described in more detail below.

Figure 3:
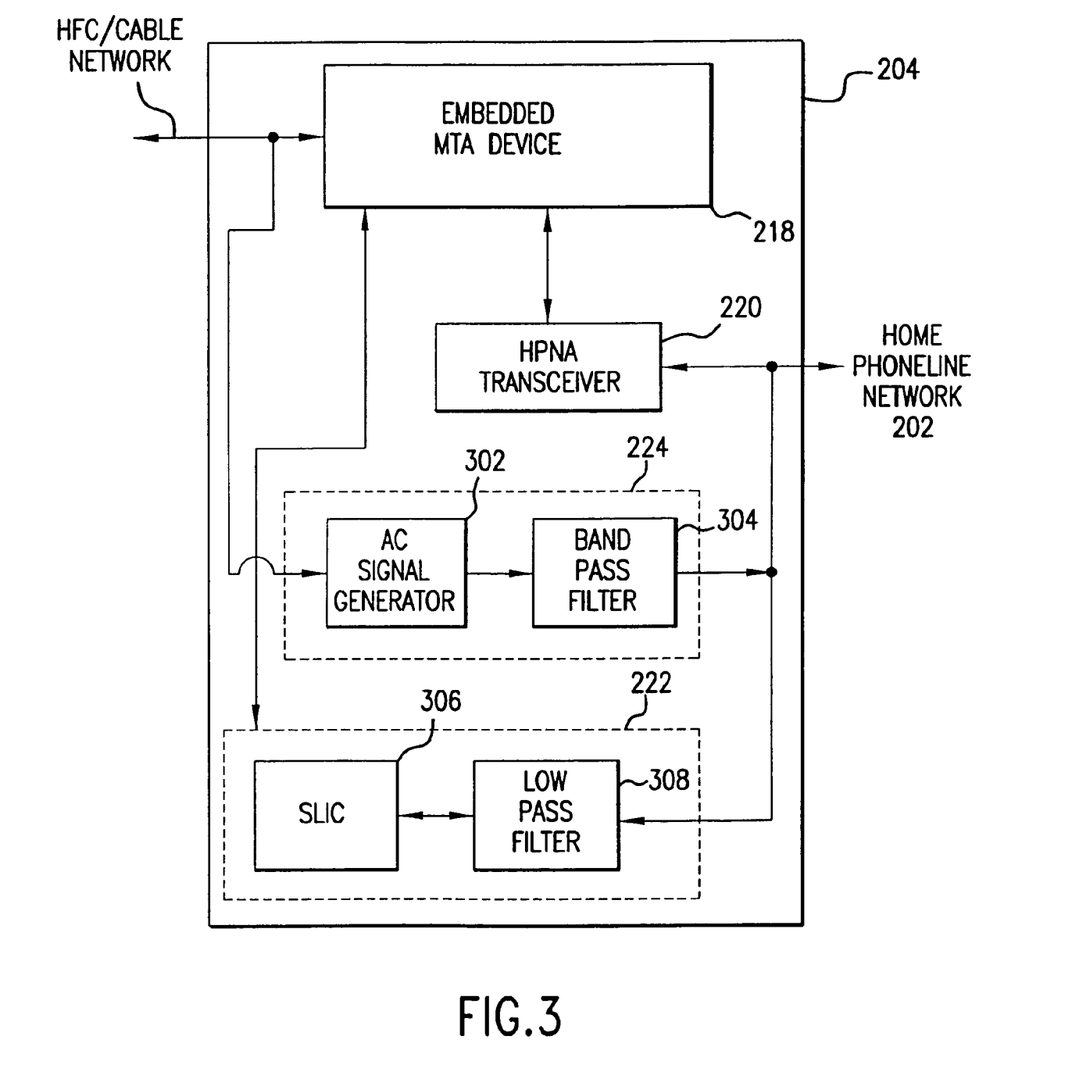
FIG. 3 depicts a residential gateway with power source in accordance with embodiments of the present invention.

C. Powering Devices Over a Home Phone Line Network in Accordance with Embodiments of the Present Invention FIG. 3 illustrates in more detail the residential gateway 204 of FIG. 2 as well as its functional sub-components. As discussed in regard to FIG. 2, the residential gateway 204 of FIG. 3 includes an embedded MTA device 218, an HPNA transceiver 220, a POTS interface 222, and a power source 224.

The embedded MTA device 218 and the HPNA transceiver 220 have been described in reference to FIG. 2, above.

As discussed above, the POTS interface 222 provides an interface between one or more POTS phones on the home phone line network 202 and the embedded MTA device 218 so that phone service may be delivered over the IP network. As shown in FIG. 3, the POTS interface 222 includes a subscriber line interface circuit (SLIC) 306 and a low pass filter 308. The SLIC 306 comprises a conventional integrated circuit for performing some or all of the POTS interface functions that are typically used in delivering standard POTS service. The low pass filter 308 is a circuit that filters out signals on the phone line that might otherwise interfere with relatively low-frequency POTS signals. In embodiments of the present invention, all POTS connections to the phone line include a low pass filter in order to attenuate the large powering signal generated by the power source 224, as will be described below.

The power source 224 generates a power signal for providing power to one or more devices on the home phone line network. For example, the power source 202 may be used to provide power to the first HPNA adapter 208, the second HPNA adapter 212, and/or the HPNA phone 216 depicted in FIG. 2. The power source 224 is itself powered by the raw rectified AC source voltage from the external HFC/cable network also used to power the embedded MTA device 218. As shown in FIG. 3, the power source 224 includes an AC signal generator 302 and a band pass filter 304. In alternate embodiments, the power source 224 is powered by a different external source, such as a xDSL line, or is powered by a local source such as a battery or residential AC utility power.

The AC signal generator 302 generates a high level AC power signal for providing power to devices on the home phone line network 202. Embodiments of the present invention utilize an AC signal, as opposed to a DC signal, to avoid interfering with POTS service on the home phone line network 202. Conventional POTS service entails providing DC power to telephones. The typical DC feed for off-hook domestic phones is roughly 25 mA. Where POTS service is provided by the telephone company's CO, line card circuitry at the CO limits the amount of feed current to the phone. However, in the home network system 200, the POTS interface 222 in the residential gateway 204 cannot distinguish the DC current feed for an off-hook phone from the DC current drawn by an HPNA adapter (e.g., HPNA adapter 208). Therefore, under fault conditions which result in high power draw and dissipation, the current cannot be properly limited by circuitry in the residential gateway 204. By utilizing an AC powered solution, embodiments of the present invention avoid this problem.

Where an AC signal is used, several issues are relevant. Both the spectral centering of the fundamental AC signal and its harmonics are of primary concern because of potential interference with the POTS voice band and the HPNA band on the shared phone line.

In particular, the power signal must not interfere with the POTS voice band, (<4 Khz) or metering bands (12 Khz/16 Khz) for international applications, as well as the HPNA band (4 MHz<f<10 MHz). To ensure that the AC signal generated by the AC signal generator 302 does not interfere with these bands, embodiments of the present invention utilize an AC signal generator 302 that generates an AC signal centered somewhere above 20 Khz and below approximately 200 Khz. Placing the AC power spectrum at a very high frequency above the HPNA band is less desirable because it reduces the power delivery capability of the transmission system. This is because losses in the cable and radiated emissions (radio frequency interference) are directly proportional to the frequency.

It is also critical that there are no subharmonics of the source frequency that would interfere with the POTS voice band or HPNA band. With AC signals that are non-sinusoidal, harmonics may appear on the line that can disrupt voice or data communications. As such, what is desired is a spectrally clean signal with low harmonics. In order to achieve this, the AC signal generated by the AC signal generator 302 is received by the band pass 304 which filters out undesired noise and harmonics before placing the signal on the home phone line network 202.

To further ensure that the power source 224 generates a spectrally pure signal, embodiments of the present invention utilize an AC signal generator 302 comprising a resonant mode power supply. A resonant mode power supply will produce a sinusoidal, spectrally pure signal in a manner that is highly efficient. Efficient power conversion is of particular importance where power delivered to a device over the home phone line network originates from the HFC/cable network and is, therefore, limited. For example, it is anticipated that, in embodiments of the present invention, the power available to the power source 224 may be less than 7 W when HFC/cable network powering is used.

A resonant mode power supply is similar in design to a class D amplifier. However, unlike a class D amplifier, the resonant mode supply can generate an AC waveform directly by exciting a resonant tank circuit that will oscillate at the desired fundamental frequency. Since this topology generates the AC signal directly, harmonic content is reduced, thus providing a cleaner waveform. For example, the harmonics from the power source 224 into a resistive load on the home phone line network should be well below the acceptable narrowband immunity limits specified for an HPNA 2.0 receiver.

In an alternative embodiment, the AC signal generator 302 may comprise an oscillator/clock and a linear amplifier. A configuration of this type is another very clean way of generating an AC power signal. In such an embodiment, an oscillator or clock is used to generate a clean sinusoid at the desired frequency. This sinusoid is then amplified and injected onto the phone line through the band pass filter. Although this technique permits the generation of a harmonically pure signal, it's relatively low efficiency of approximately 50% renders it unacceptable for applications in which power is limited, i.e., where the power is received from the HFC/cable network.

In a further alternative embodiment, the AC signal generator 302 may comprise a class D amplifier. A class D amplifier is a switched mode topology in which the AC waveform is created by modulating the duty cycle of the switching waveform and then filtering out the high frequencies. A class D type of amplifier is highly efficient. However, the complexity of this design may limit it's usefulness due to a potential increase in the cost of the design. Also, a class D amplifier may be considered undesirable because it utilizes a switching frequency that must be several times the output frequency, which means that its lower order harmonics may interfere with the HPNA band.

Figure 5:
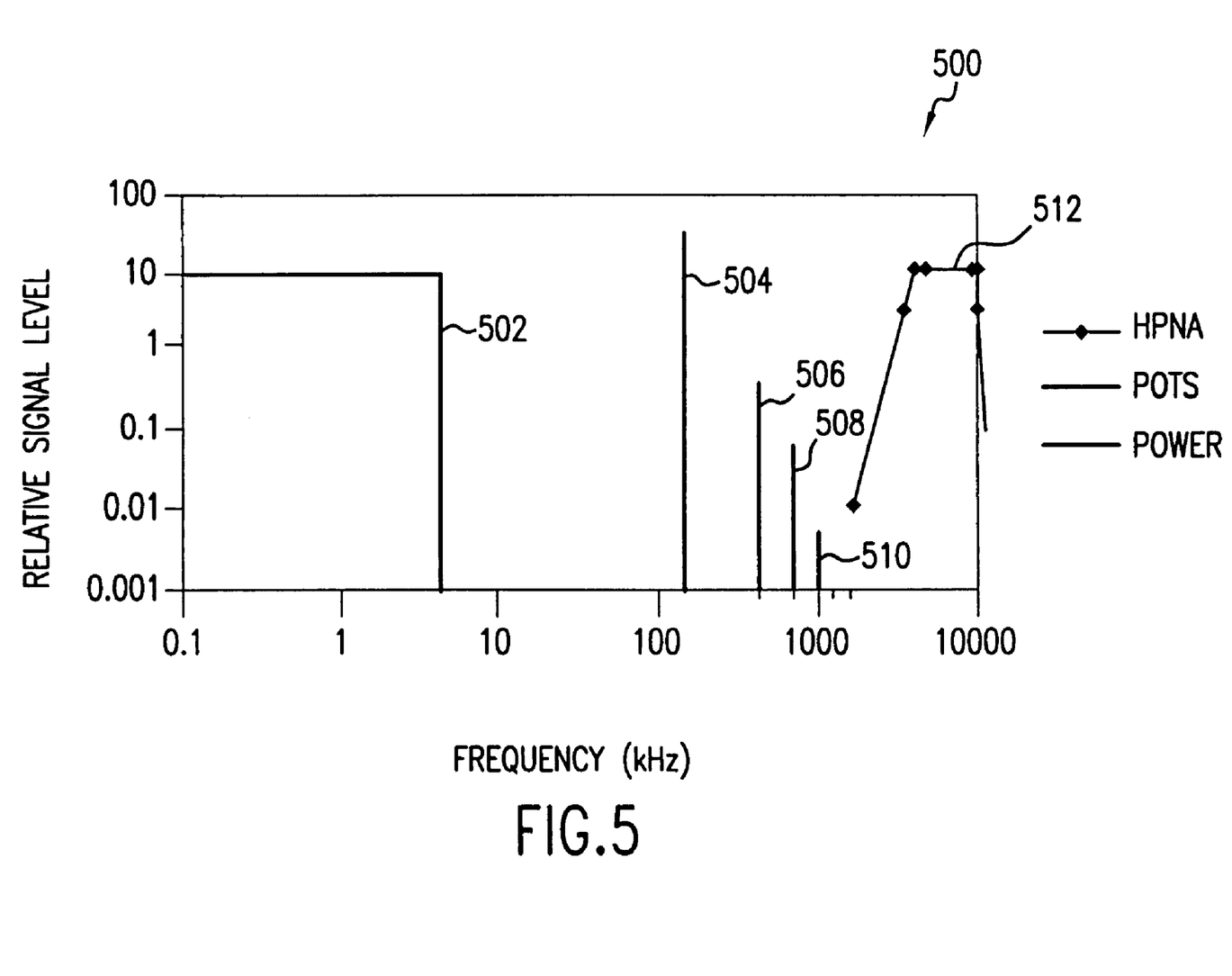
FIG. 5 depicts spectrum use of a home phone line network by a voice service, a data service, and a power source in accordance with embodiments of the present invention.

FIG. 5 presents a chart 500 that depicts available spectrum use of a phone line by POTS, HPNA and a power source in accordance with embodiments of the present invention. As can be seen in the chart 500, the POTS service, represented by line 502, dominates the lower frequencies, while the HPNA service, marked by the line 512, dominates the higher frequencies. Thus, in accordance with embodiments of the present invention, the desired power signal and its harmonics will not interfere with either of these bands. Here, the AC power signal, marked as the line 504, is centered at approximately 150 kHz. In addition, the harmonics of the AC power signal are also marked as lines 506, 508 and 510. As shown in the chart 500, these harmonic signals approach the HPNA band, but will not interfere with the HPNA band when properly attenuated. Proper attenuation may entail additional filtering to comb off higher frequency harmonics that may interfere with HPNA.

In addition to ensuring spectral compatibility with POTS and HPNA, another primary design constraint is the need for high efficiency due to the limited power available from the HFC/cable network. Since a high efficiency system is required due to limited network power, it is desired to minimize the power loss in the wiring. Since the loss may be defined as $I^2R$, the maximum efficiency with respect to the transmission of power is obtained by maximizing the voltage and minimizing the current. However, UL 1950 restricts non-hazardous safety voltage levels for Safety Extra Low Voltage (SELV) circuits to less than 42.4 V peak (30 Vrms for a sinusoid). Thus, in order to maximize the voltage while complying with UL 1950 limits, embodiments of the present invention utilize a source voltage level below 30 Vrms. In embodiments, a source voltage of 28 Vrms is used in order to allow for a margin of error.

Figure 4A:
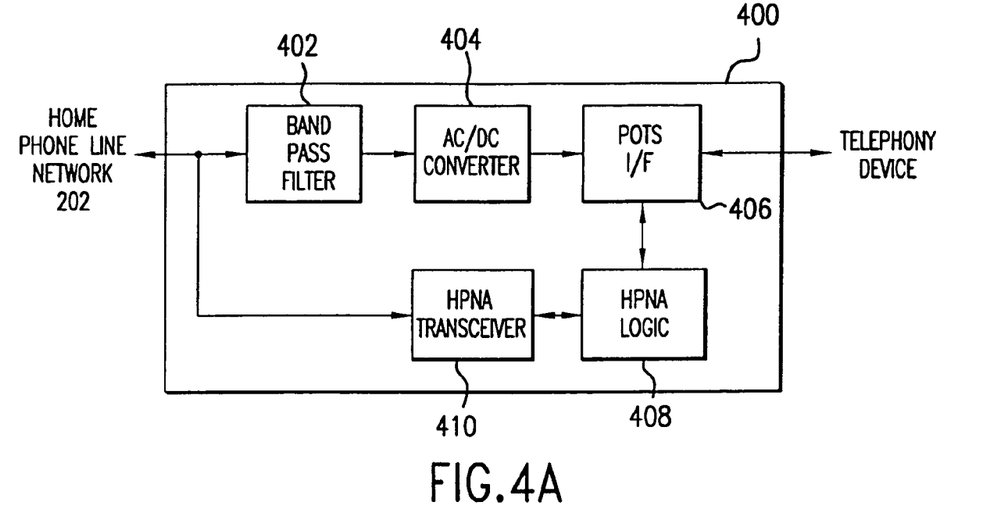
FIG. 4A depicts a home phone line network telephone adapter in accordance with embodiments of the present invention.

FIG. 4A depicts an HPNA adapter 400 in accordance with embodiments of the present invention. The HPNA adapter 400 is analogous to either the first HPNA adapter 208 or the second HPNA adapter 212 described in regard to FIG. 2, above. The HPNA adapter 400 is a media adapter that converts voice communications from POTS to HPNA and, conversely, from HPNA to POTS, so that standard POTS telephony devices may be connected to the home phone line network 202 for VoIP communication.

As shown in FIG. 4A, the HPNA adapter 400 includes a band pass filter 402, an AC/DC converter 404, a POTS interface 406, HPNA logic 408, and an HPNA transceiver 410.

Telephone communication via the HPNA adapter 400 is carried out as follows. Voice signals are received from a POTS telephony device by the POTS interface 406. These signals are passed to the HPNA logic 408 which converts them into digital signals consistent with the HPNA protocol. The digital signals are then passed to the HPNA transceiver 410, which converts them into analog HPNA signals for transmission over the home phone line network 202 to the residential gateway 204. At the residential gateway 204, the HPNA signals are converted into packets for transmission over the IP network to the cable headend.

Conversely, voice packets received from the cable headend are converted into HPNA signals at the residential gateway 204 and passed to the HPNA adapter 400 via the home phone line network 202. The analog HPNA signals are received by the HPNA transceiver 410, which converts them into digital HPNA signals for processing by the HPNA logic 408. The HPNA logic 408 converts the digital HPNA signals into voice signals consistent with POTS and passes them to the POTS interface 406, where they are relayed to the POTS telephone device attached to the HPNA adapter 400.

In embodiments of the present invention, the HPNA adapter 400 is powered by the AC power signal generated by the power source 224 in the residential gateway 204, as discussed above. The AC power signal is received by the HPNA adapter 400 over the home phone line network 202. The AC/DC converter 404 converts the AC signal into DC power that is used to power the HPNA adapter 400.

The AC/DC converter 404 may be any conventional circuit for converting an AC signal into a DC signal. In embodiments, the AC/DC converter 404 includes a diode full-wave bridge and filter capacitor, which is inherently non-linear and will thus introduce harmonic distortion on the phone line that may interfere with HPNA signals even if powered by a pure sine wave source. Accordingly, the band pass filter 402 operates to prevent the introduction of undesired harmonics created by the AC/DC converter onto the home phone line network 202.

In particular, the band pass filter 402 performs at least two functions. First, it forces the power factor of the AC/DC converter loading to be virtually 1, thereby restricting the AC power signal passing through it to be at the fundamental frequency only and the load voltage and current to be in phase, yielding 1 Watt per Volt-Amp. As a result, the non-linearities of the rectification of the sine wave signal by the AC/DC converter are not passed through to the phone line. Second, the power circuit, which comprises the band pass filter 402 and the AC/DC converter 404, must not load the line in the POTS and HPNA bands and must co-exist with the existing impedance masks defined by those standards. Therefore, the band pass filter 402 and the AC/DC converter 404 present a high load impedance in both bands.

Figure 4B:
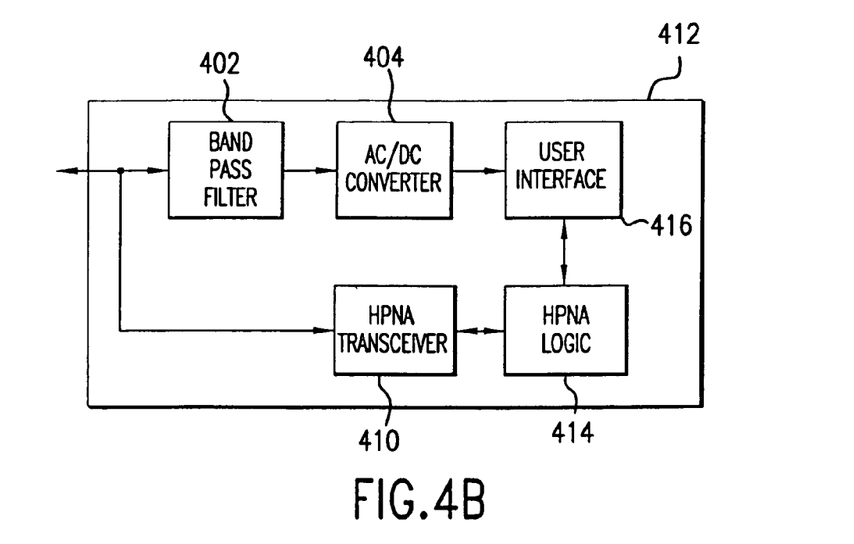
FIG. 4B depicts a home phone line network telephone in accordance with embodiments of the present invention.

FIG. 4B illustrates an HPNA phone 412 in accordance with embodiments of the present invention. The HPNA phone 412 is analogous to the HPNA phone 216 described in regard to FIG. 2, above. The HPNA phone 412 is similar to the HPNA adapter 400, except that no POTS interface is required for communication. Instead, the HPNA logic 414 performs the necessary voice transport and signaling functions required for Internet telephony. Also, the HPNA phone 412 incorporates a user interface 416, which may comprise a telephone handset, headset, or microphone/speaker for sending and receiving voice signals to and from a local user, that interfaces to the HPNA logic. As shown in FIG. 4B, the powering logic for the HPNA phone 412 is essentially the same as that used for the HPNA adapter 400. This logic comprises a band pass filter 402 and AC/DC converter 404 that operate in the same general manner described in regard to the HPNA adapter 400.

Figure 6:
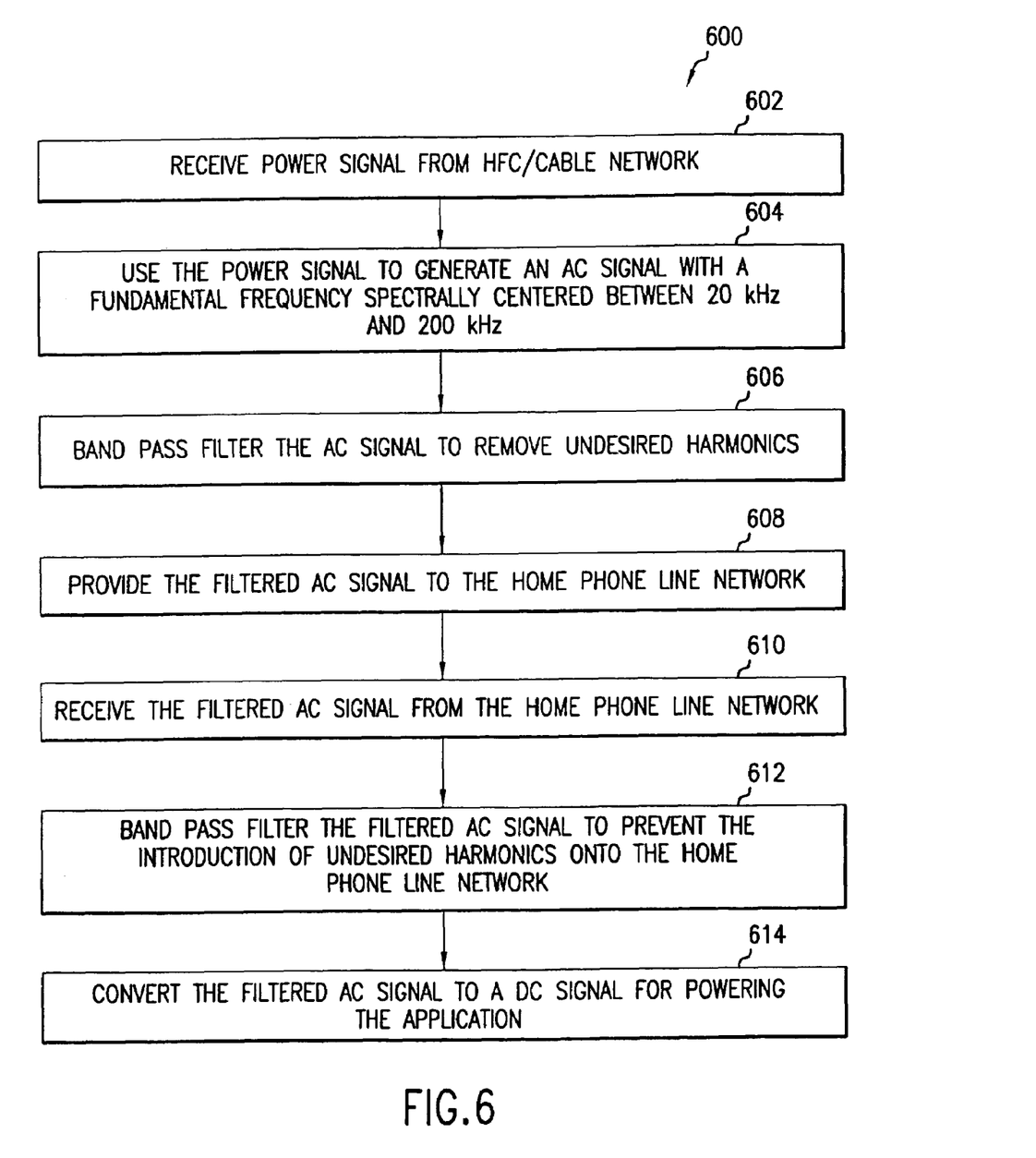
FIG. 6 depicts a flowchart of a method for powering devices over a home phone line network in accordance with embodiments of the present invention.

FIG. 6 depicts a flowchart 600 of a method for powering devices over a home phone line network in accordance with embodiments of the present invention. The invention, however, is not limited to the description provided by the flowchart 600. Rather, it will be apparent to persons skilled in the art from the teachings provided herein that other functional flows are within the scope and spirit of the present invention. The flowchart 600 will be described with continued reference to the residential gateway 204 of FIG. 3, the HPNA adapter 400 of FIG. 4A and the HPNA phone 412 of FIG. 4B.

At step 602, a power signal is received from the HFC/cable network by the residential gateway 204.

At step 604, the power signal from the HFC/cable network is received by the AC signal generator 302 within the residential gateway 204 and is used to generate an AC signal. In embodiments, the AC signal has a fundamental frequency spectrally centered between 20 kHz and 200 kHz.

At step 606, the AC signal generated by the AC signal generator 302 is received by the band pass filter 304, which filters the AC signal to remove undesired harmonics. For example, the band pass filter 304 filters the AC signal to remove undesired harmonics that could interfere with HPNA signals on the home phone line network 202.

At step 608, the filtered AC signal is provided from the band pass filter 304 to the home phone line network 202 for transmission to other devices on the home phone line network.

At step 610, a device on the home phone line network 202, such as the HPNA adapter 400 or the HPNA phone 412, receives the filtered AC signal from the network.

At step 612, the band pass filter 402 within the HPNA adapter 400 or the HPNA phone 412 passes the filtered AC signal to the AC/DC converter 404. The band pass filter 402 also operates to prevent the introduction of undesired harmonics created by a non-linear source such as the AC/DC converter 404 onto the home phone line network 202. For example, the band pass filter 402 prevents the introduction of undesired harmonics created by the AC/DC converter that could interfere with HPNA signals on the home phone line network 202.

At step 614, the AC/DC converter 404 within the HPNA adapter 400 or the HPNA phone 412 receives the filtered AC signal from the band pass filter 402 and converts it into a DC signal for powering the HPNA adapter 400 or the HPNA phone 412.

D. CONCLUSION

While various embodiments of the present invention have been described above, it should be understood that they have been presented by way of example only, and not limitation. For example, the present invention may be implemented on a home phone line network that uses a protocol other than HPNA for modulating data traffic. Furthermore, the present invention is not limited to delivering power only to telephony devices, such as adapters and phones, but may be used to power any type of electronic device that can reside on a home phone line network. Also, the invention need not be powered by the HFC/cable network, but instead may be powered by other external sources, such as an xDSL line, or local sources such as a battery or adapter that operates off of the residential AC power supply.

Accordingly, it will be understood by those skilled in the art that various changes in form and details may be made to the embodiments of the present invention that have described herein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. An adapter for a telephony device, comprising:
   a telephony interface adapted to transmit analog voice signals to and receive analog voice signals from the telephony device;
   a home phone line network interface coupled to the telephony interface, the home phone line network interface adapted to convert analog voice signals received from the telephony interface into analog home phone line network signals for transmission over a phone line, and to convert analog home phone line network signals received from the phone line to analog voice signals for transmission to the telephony interface; and
   an AC/DC converter adapted to receive an AC signal from the phone line and to convert the AC signal into a DC signal for powering the telephony adapter, wherein the AC signal has a fundamental frequency spectrally centered between 20 kHz and 200 kHz.

2. The adapter of claim 1, wherein the telephony interface is adapted to transmit Plain Old Telephone Service (POTS) voice signals to and receive POTS voice signals from the telephony device.

3. The adapter of claim 1, wherein the home phone line network interface comprises:
   home phone line network logic adapted to convert analog voice signals received from the telephony interface into digital home phone line network signals and to convert digital home phone line network signals into analog voice signals for transmission to the telephony interface; and
   a home phone line network transceiver adapted to convert digital home phone line network signals received from the home phone line network logic to analog home phone line network signals for transmission over the phone line and to convert analog home phone line network signals received from the phone line into digital home phone line network signals for transmission to the home phone line network logic.

4. The adapter of claim 3, wherein the digital and analog home phone line network signals are compliant with a Home Phoneline Networking Alliance (HPNA) standard.

5. The adapter of claim 1, further comprising:
   a band pass filter adapted to receive and filter the AC signal from the phone line, thereby preventing the introduction of undesired harmonics onto the phone line from the AC/DC converter.

6. The adapter of claim 1, wherein the AC signal is sinusoidal.

7. A telephony device, comprising:
   a user interface adapted to send and receive analog voice signals to and from a user, respectively;
   a home phone line network interface coupled to the user interface, the home phone line network interface adapted to convert analog voice signals received from the user interface into analog home phone line network signals for transmission over a phone line, and to convert analog home phone line network signals received from the phone line to analog voice signals for transmission to the user interface; and an AC/DC converter adapted to receive an AC signal from the phone line and to convert the AC signal into a DC signal for powering the telephony device, wherein the AC signal has a fundamental frequency spectrally centered between 20 kHz and 200 kHz.

8. The telephony device of claim 7, wherein the home phone line network interface comprises:

home phone line network logic adapted to convert analog voice signals received from the user interface into digital home phone line network signals and to convert digital home phone line network signals into analog voice signals for transmission to the user interface; and a home phone line network transceiver adapted to convert digital home phone line network signals received from the home phone line network logic to analog home phone line network signals for transmission over the phone line and to convert analog home phone line network signals received from the phone line into digital home phone line network signals for transmission to the home phone line network logic.

9. The telephony device of claim 8, wherein the digital and analog home phone line network signals are compliant with a Home Phoneline Networking Alliance (HPNA) standard.

10. The telephony device of claim 7, further comprising:
a band pass filter adapted to receive and filter the AC signal from the phone line, thereby preventing the introduction of undesired harmonics onto the phone line from the AC/DC converter.

11. The telephony device of claim 7, wherein the AC signal is sinusoidal.

12. The telephone device of claim 7, wherein the user interface comprises a microphone and speaker.

13. A method for powering an adapter for a telephony device coupled to a home phone line network in a manner that is interoperable with Plain Old Telephone Service (POTS) and Home Phoneline Network Alliance (HPNA) services operating on the same home phone line network, comprising:

receiving an AC signal from the home phone line network, the AC signal occupying a frequency band above a frequency band occupied by the POTS service and below a frequency band occupied by the HPNA service;

band pass filtering the received AC signal to prevent the introduction of undesired harmonics onto the home phone line network; and converting the AC signal to a DC signal for powering the telephony adapter.

14. The method of claim 13, wherein the AC signal has a fundamental frequency that is spectrally centered between 20 kHz and 200 kHz.

15. The method of claim 13, further comprising:
transferring HPNA signals between the adapter and the home phone line network.

16. The method of claim 13, further comprising:
transferring POTS signals between the adapter and the home phone line network.

17. A method for powering a telephony device coupled to a home phone line network in a manner that is interoperable with Plain Old Telephone Service (POTS) and Home Phoneline Network Alliance (HPNA) services operating on the same home phone line network, comprising:

receiving an AC signal from the home phone line network, the AC signal occupying a frequency band above a frequency band occupied by the POTS service and below a frequency band occupied by the HPNA service;

band pass filtering the received AC signal to prevent the introduction of undesired harmonics onto the home phone line network; and converting the AC signal to a DC signal for powering the telephony device.

18. The method of claim 17, wherein the AC signal has a fundamental frequency that is spectrally centered between 20 kHz and 200 kHz.

19. The method of claim 17, further comprising:
transferring HPNA signals between the telephony device and the home phone line network.

* * * * *